June 2, 1959

J. R. CRABB 2,889,130

WEIGHING AND BAGGING MACHINE FOR PRODUCE
OR OTHER HETEROGENEOUS COMMODITIES

Filed June 13, 1955

INVENTOR.
JASPER R. CRABB

BY

ATTORNEYS.

INVENTOR.
JASPER R. CRABB

June 2, 1959
J. R. CRABB
2,889,130
WEIGHING AND BAGGING MACHINE FOR PRODUCE
OR OTHER HETEROGENEOUS COMMODITIES
Filed June 13, 1955
7 Sheets-Sheet 5

INVENTOR.
JASPER R. CRABB
BY
ATTORNEYS.

June 2, 1959

J. R. CRABB 2,889,130

WEIGHING AND BAGGING MACHINE FOR PRODUCE
OR OTHER HETEROGENEOUS COMMODITIES

Filed June 13, 1955

INVENTOR.
JASPER R. CRABB
BY
ATTORNEYS.

United States Patent Office 2,889,130
Patented June 2, 1959

2,889,130

WEIGHING AND BAGGING MACHINE FOR PRODUCE OR OTHER HETEROGENEOUS COMMODITIES

Jasper R. Crabb, Yakima, Wash., assignor to National Industrial Products Company, a corporation of Ohio Application June 13, 1955, Serial No. 515,051

8 Claims. (Cl. 249—17)

My invention relates to a weighing and bagging machine for produce or other heterogeneous commodities. It has to do, more specifically, with a machine which is designed especially for automatically and successively weighing produce in preselected amounts or charges and for feeding each charge after weighing, under the control of an operator, into a bag or other container properly held by the operator in association with the machine.

Most bagging scales as now constructed embody means for suspending a bag from a weighing lever with which the commodity is charged by a feeding conveyor. This not only requires complicated and expensive bag-gripping means but also produces excessive shocks on the weighing lever due to the dropping of the commodity into the suspended bag. With the bags suspended in this manner there is a resultant overhang which tends to bind the check rods and the constant dropping of the commodity into the suspended bags tends to loosen and damage scale parts. Also, to adapt the prior art machines or scales to various sizes of bags, it is necessary to provide various sizes of bag-suspending means which must be substituted for each other as occasion demands. Production rates on these prior art machines are predetermined and are not controlled by the operator. In order to prevent underweights from occurring, these prior art machine are designed for operating overweight with resultant excessive product loss since no provision is made for hand trimming which is necessary with produce to closely approach exact weight because of the wide differences in weight of successive articles of the commodity. There are other common faults of prior art weighing and bagging machines such as troublesome conveyor systems and bridging hoppers.

One of the objects of my invention is to provide a scale for use in weighing and bagging produce or other commodities consisting of heterogeneous articles which is so designed that it is not necessary to suspend the commodity receiving bags or containers from the weighing lever during the weighing operation with resulting damage to the scale and inaccuracies in the weighed charge.

Another object of my invention is to provide a weighing and bagging machine which is automatic in its weighing operation but the production rate of which is under the control of the operator.

Another object of my invention is to provide a weighing and bagging machine which is so designed that the operator can readily add articles of selected size to or remove selected articles from the charge being weighed so that an exact predetermined weight of a charge can be obtained with the result that there is no danger of underweight charges without undue loss of product due to giving overweight as a safety factor.

Still another object of my invention is to provide a weighing and bagging scale which is so designed that it can be used in filling bags of various sizes without any substitution of parts or complicated adjustments.

A further object of my invention is to provide a machine which is of a very rugged and foolproof nature, which is provided with a simple and highly efficient conveyor system that has a large capacity and is sufficiently strong to withstand severe shock of heavy loads, and which is provided with a commodity hopper, from which the feed is made, that is so designed as to prevent bridging.

Another object of my invention is to provide a weighing and bagging scale which is compact and so designed that the operator is comfortable in using it, which is extremely rigid but which is still readily portable.

Various other objects will be apparent.

According to my invention I provide a weighing and bagging machine which comprises a hopper which is to receive a large supply of the commodity to be weighed and bagged. This hopper has associated therewith a feed conveyor which feeds the commodity to the weighing scale of the machine. The weighing scale comprises a weighing lever which is connected to an over-and-under weight indicator. Associated with this over-and-under weight indicator is a switch which is connected in an electric circuit with a control which controls the driving of the feed conveyor. As the weighing lever approaches balance, the switch is actuated to cause the control to interrupt the drive of the feed conveyor. The weighing lever carries on the commodity end thereof a weighing conveyor which receives the commodity fed from the feed conveyor. This weighing conveyor is driven continuously and tends to carry the material, which is fed to it by the feed conveyor, towards a discharge scoop gate which supports at least part of the commodity during the weighing operation. This gate is so designed that it will cooperate with any size bag to direct the weighed charge thereinto at the will of the operator. When the gate is operated to discharge the material accumulated on the commodity weighing conveyor, and is then returned to closed position, a second electric switch is actuated which again energizes the circuit that controls the feed conveyor and causes such conveyor to again feed until the feed is once more interrupted by the scale lever moving into correct-weight position. The weighing conveyor is so designed and located that the operator can readily trim the charge by removing selected articles therefrom or depositing thereon additional articles.

In the accompanying drawings I have illustrated the preferred embodiment of my invention. In these drawings:

Figure 8 is a diagrammatic view of the driving means and solenoid control for the feed conveyor.

Figures 1, 2:
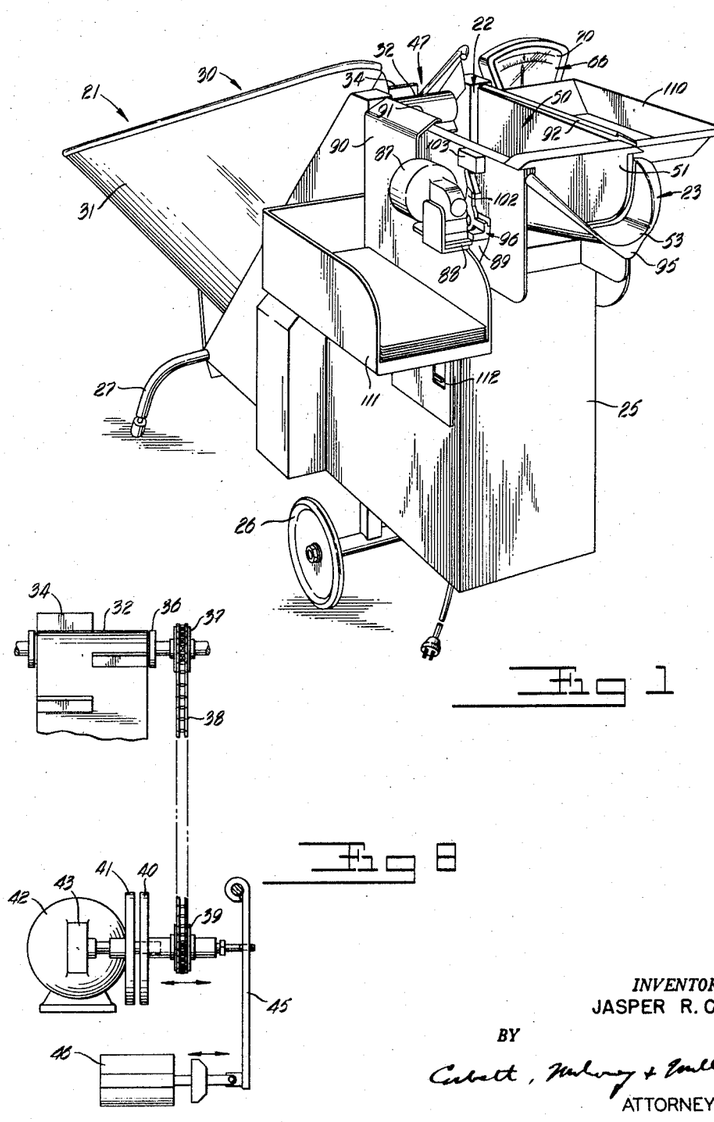
Figure 1 is a perspective view of a weighing and bagging machine made according to my invention.
Figure 2 is a longitudinal vertical sectional view taken along line 2—2 of Figure 3.
Figures 3, 9, 10:
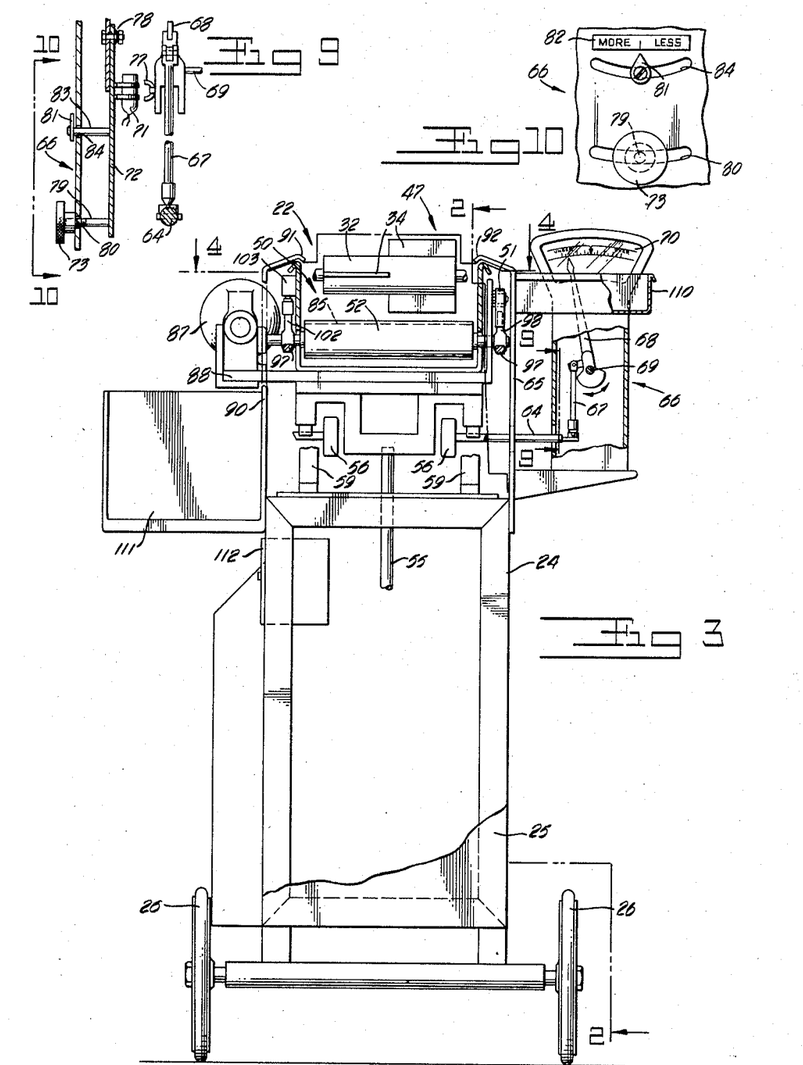
Figure 3 is a transverse vertical sectional view taken along line 3—3 of Figure 2.
Figure 9 is a vertical sectional view of the indicator and the associated electric switch which controls the feed conveyor.
Figure 10 is a face view of the switch adjusting means taken along line 10—10 of Figure 9.

With reference to the drawings and particularly to Figures 1, 2 and 3, I have illustrated my weighing and bagging machine as comprising mainly a hopper and feeding unit 21, a weighing unit 22, and a delivery unit 23 arranged in sequence from right to left in Figure 2. All of these units are supported on a suitable frame 24 fabricated from angle-irons or other suitable metal members and enclosed within a cabinet type housing 25. The frame 24 is carried at one end by a pair of rubber-tired wheels 26 so that it will be readily portable and its other end is provided with a pair of legs 27 which are adjustable for leveling. Obviously, the one end of the frame can be lifted by means of the legs 27, which will serve as handles, for trundling the machine on the wheels 26 to a different location. As will be apparent hereinafter, the hopper and feeding unit 21 is so located that the produce or other commodity to be weighed can be dumped thereinto readily from carts or supplied by conveyors. The discharge unit 23 is located at a proper height convenient for the operator to manipulate it and fill bags or other containers with commodities which are weighed on the unit 22.

Figures 2, 7:
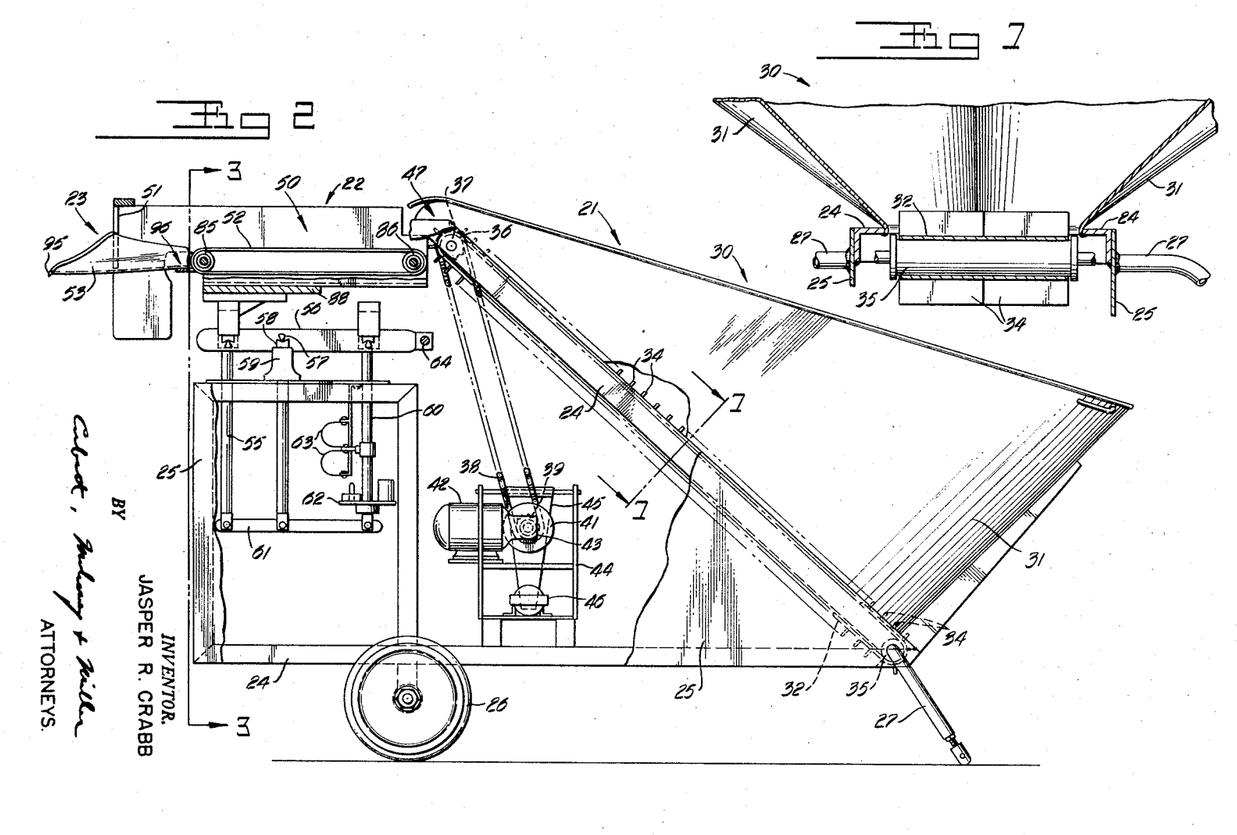
Figure 7 is a transverse sectional view taken through the hopper and the associated feed conveyor along line 7—7 of Figure 2.

The hopper and feeding unit 21 includes the hopper 30 which is of tub-like form and is disposed in an inclined position so that its forward side extends from a point adjacent the legs 27 to a point adjacent the unit 22 as shown in Figure 2. The outer wall of the hopper is so formed, as shown in Figures 2 and 7, that the side-wall sections 31 taper inwardly and converge towards the forward side of the hopper to provide at that side a narrow channel in which a feed conveyor 32 is disposed. The lower wall of the hopper is formed by the arcuate converging of the wall-sections 31 substantially straight and perpendicular to the conveyor 32 but since the hopper 30 is tilted as indicated, it extends downwardly and forwardly towards the conveyor 32. With this arrangement, the lower end of the hopper 30 is so positioned that produce can be dumped therein readily and this produce will be directed without bridging towards the conveyor 32 which will form the forward wall of the hopper.

Figure 4:
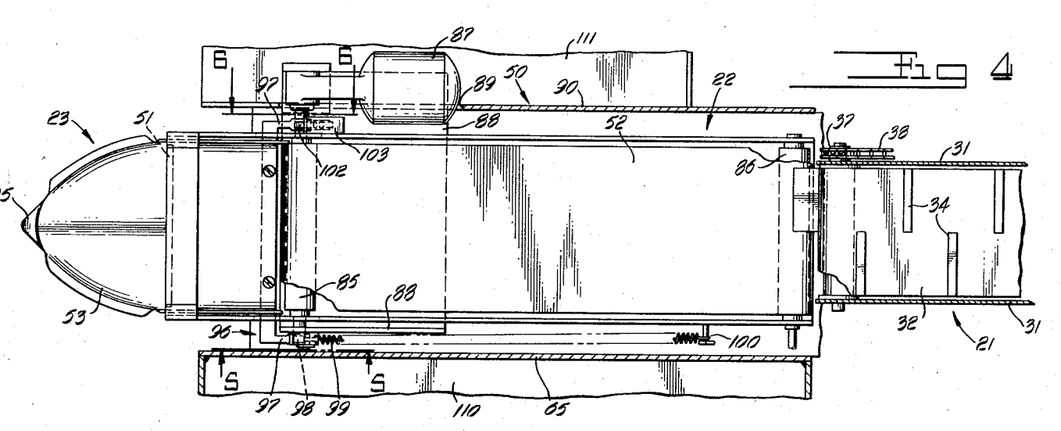
Figure 4 is a horizontal sectional view taken along line 4—4 of Figure 3.

The conveyor 32 is of the ladder type being formed as a continuous belt with the cleats 34 formed thereon (Figures 2, 4, 7 and 8) which extend transversely of the belt and are disposed at uniformly spaced longitudinal intervals. As shown in Figures 4 and 8, each of these cleats 34 extends one-half the width of the belt and successive cleats are disposed alternately at opposite sides of the center line of the belt. These cleats 34 project perpendicularly from the flat surface of the endless belt. The belt passes around the lower and upper rollers 35 and 36 which are rotatably mounted on the frame 24. The roller 35 is an idler roller while the roller 36 is positively driven by means of a sprocket 37 which, in turn, is driven by the sprocket chain 38. This drive arrangement is shown best in Figures 2 and 8. The chain 38 is driven by means of a sprocket 39 which is on the driven section 40 of a friction-type clutch. The driving disc 41 of this clutch is continuously driven by an electric motor 42 through a speed-reduction unit 43. The motor 42 and associated parts are supported on a sub-frame 44 which is carried by the frame 24 as shown best in Figure 2. The clutch is actuated by means of an actuating lever 45 which is controlled by a solenoid 46. The feed conveyor 32 is driven whenever the clutch is engaged by energizing the solenoid 46. The side-walls 31 of the hopper 30 converge bodily towards each other at the upper end of the hopper to form a narrow discharge throat 47 (Figures 1 and 2) through which the upper end of the conveyor 32 will discharge produce that it feeds from the hopper 30.

The conveyor 32 discharges the produce into a weighing compartment 50 (Figures 1 and 2) of the weighing unit 22. This weighing compartment is mounted for vertical movement at the upper side of the cabinet 25. The compartment 50 is open at its inlet end to receive the produce discharged by the conveyor 32 through the narrow throat 47. The opposite end of the compartment 50 is closed by a stationary baffle or wall 51 which is a part thereof. The top of the compartment 50 is open and the bottom is formed by a weighing belt 52 and a pivoted scoop gate 53 which cooperate with the baffle 51. The scoop gate 53 is pivoted to the side-walls of the compartment 50 for vertical swinging movement and will be described more in detail later. It will be noted from Figures 2 and 3 that the weigh belt 52 is at a lower level than the upper discharge end of the feed belt of the conveyer 32.

The weighing belt 52 is carried on the commodity outrider 55 of a weighing scale of a suitable type and which includes a beam or lever 56, the two sides of which are shown in Figure 3, which is fulcrumed at 57, intermediate its length, on a bearing structure 58 that is carried by an upstanding double extension 59 of the frame 24. The lever 56 pivotally carries the commodity outrider 55 at one side of the fulcrum 57 and pivotally carries the counterweight outrider 60 at the other side. A checkrod structure 61 (Figure 2) connects the two outriders in the usual way. The counterweight outrider structure 60 carries the weight platform 62 for receiving suitable counterweights and has connected to it the flexes 63 in the form of opposed U-shape springs which are anchored to a part of the frame extension 59 and resist movement of the lever 56 in either direction away from balanced position.

As shown in Figure 3, the lever 56 is provided with a rigid arm 64 extending laterally therefrom through a slot formed in a vertical plate 65 which extends upwardly from and is rigidly attached to the cabinet 25. The outer end of this arm 64 extends into an indicator tower 66 which is disposed on a support provided at the right-hand side (Figure 3) of the cabinet 25. This arm 64 is connected by means of a gravity-type push rod 67 to the indicator pointer 68 which is of the pendulum type and is pivoted in the tower at 69. The upper end of this pointer 68 cooperates with a dial 70 of the over-and-under weight type which is mounted in the upper end of the tower 66.

Associated with the lower end of the indicator pointer 68 in the tower 66, as shown in Figure 9, is a mercury switch 71. This mercury switch, as will later appear, is adapted to control the clutch solenoid 46, previously mentioned, which controls the feed-conveyor 32. The switch 71 is fastened to the side of the tower 66 by means of an adjustable bracket 72. This bracket is pivoted to the tower at 78 and is adjustable from the exterior of the tower by means of a knob 73 (Figure 10) which may be shifted in a gauge slot 84 and set in a fixed position by tightening the knob 73 which is of the adjustable clamping type and is carried by a screw 79 on the lower end of the bracket 72 which extends out through an arcuate clamp slot 80 in the tower. A pointer 81 is disposed outside the tower and cooperates with a dial 82. The pointer is carried on the outer end of a pin 83 which is carried by the bracket 72 and extends out through the arcuate slot 84 in the tower. The lower end of the indicator pointer 68 carries an electromagnet 77 which swings in a vertical plane closely adjacent the switch 71 in accordance with the swinging of the indicator pointer 68. The magnet 77 is so located that when the scale lever 56 and the pointer 68 moves to correct-weight position, the switch 71 opens. However, bracket 72 can be adjusted to vary the position of the switch 71 relative to the indicator pointer 68 and, therefore, vary the instant when the switch 71 opens. This switch 71 is included in a circuit with the clutch solenoid 46 and this circuit will be described in detail later.

As indicated in Figures 2 and 4, the weighing belt 52 is carried by the rollers 85 and 86 which are rotatably mounted at the opposite ends of the weighing compartment 50 in the sidewalls thereof. The roller 86 is an idler roller whereas the roller 85 is positively driven by means of an electric motor 87. This motor 87 is carried on a lateral extension of the platform 88 which is carried on the outrider 55. This extension passes outwardly through a vertical slot 89 formed in a vertical plate 90 which extends upwardly from and is attached to the cabinet 25 and is free to move vertically therein. Thus, the weighing belt 52 and the driving means therefor are carried by the outrider element 55, along with the weighing compartment 50, for vertical movement with the commodity end of the weighing lever 56. The motor 87 drives the weighing belt 52 continuously and is connected in the electric circuit of the machine in a manner to be describer later. The plates 65 and 90 have inturned lips 91 and 92 formed respectively on their upper ends, which cooperate with the upper edges of the side-walls of the compartment 50 (Figure 3) to limit upward movement of the weighing compartment and to prevent dirt from dropping into the scale mechanism.

Figure 5:
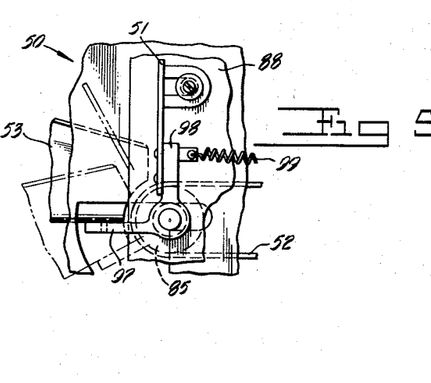
Figure 5 is a detail in side elevation illustrating the scoop gate and its operation.

As previously indicated, the scoop gate 53 is disposed at the outlet end of the weighing compartment 50 and is carried on the weighing compartment for movement therewith. This gate in its closed position is just below the level of the weighing belt 52 (Figure 2) and, along with the weighing belt, forms the bottom of the compartment 50. Thus, the bottom of the compartment is formed throughout the greater portion of its length by a continuously moving belt and the remainder of its length, at the discharge end, is formed by the stationary surface of the gate 53. The gate 53 is scoop-shaped and, when in its upper position, closely embraces the associated semi-circular lower edge of the baffle 51 which, as previously described, is at the discharge end of the weighing compartment, as shown best in Figure 1. The extreme outer end of the scoop 53 is pointed, as indicated at 95 in Figures 1 and 4, so that it can cooperate with various size bags to direct the material from the weighing compartment 50 into the opened end of each bag. The scoop 53 is carried by a transverse bracket 96 which is U-shaped and which is provided with inwardly directed legs 97 that are pivoted on the same shaft that carries the weigh belt roller 85. This bracket 97 carries at one side (Figure 5) an upstanding actuating rocking arm 98 to which a tension spring 99 is attached, this spring being anchored at its opposite end, as indicated at 100, to the corresponding side of the weighing compartment 50. The spring 99 acting on the rocking arm 98 tends to swing the scoop 53 upwardly into contact with the baffle 51 to normally hold it in this closed position.

Figure 6:
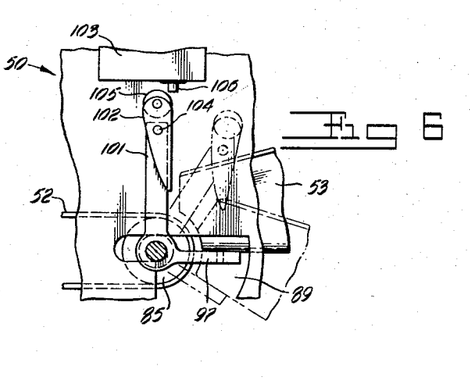
Figure 6 is a view similar to Figure 5 but taken from the opposite side of the machine.

At its opposite side, the bracket 96 is provided with an upstanding arm 101 (Figure 6) which carries a switch-actuating trigger 102 which is adapted to actuate an electric switch 103 that also controls the feed conveyor 32 and is connected in the circuit of the machine as will be described later. The trigger 102 is of the pendulum type pivoted at 104 to the arm 101 so that gravity normally tends to keep it upright. It carries on its upper end a roller 105 which is adapted to engage the push button 106 of the switch 103. The switch 103 is carried on the corresponding side of the weighing compartment 50 adjacent its upper edge as shown best in Figure 1.

Carried by the vertical plate 65 adjacent the weighing compartment 50 and to the right thereof (Figures 1 and 3) is a tray 110 which is adapted to contain a small amount of produce which will be convenient for the operator for hand trimming during the weighing operation. At the opposite side of the cabinet 25 and carried by the vertical plate 90, is a tray 111 adapted to contain the bags to be filled. The main switch 112 for the electric circuit of the scale may be located below this tray 111 so that it will be convenient to the operator.

Figure 18:
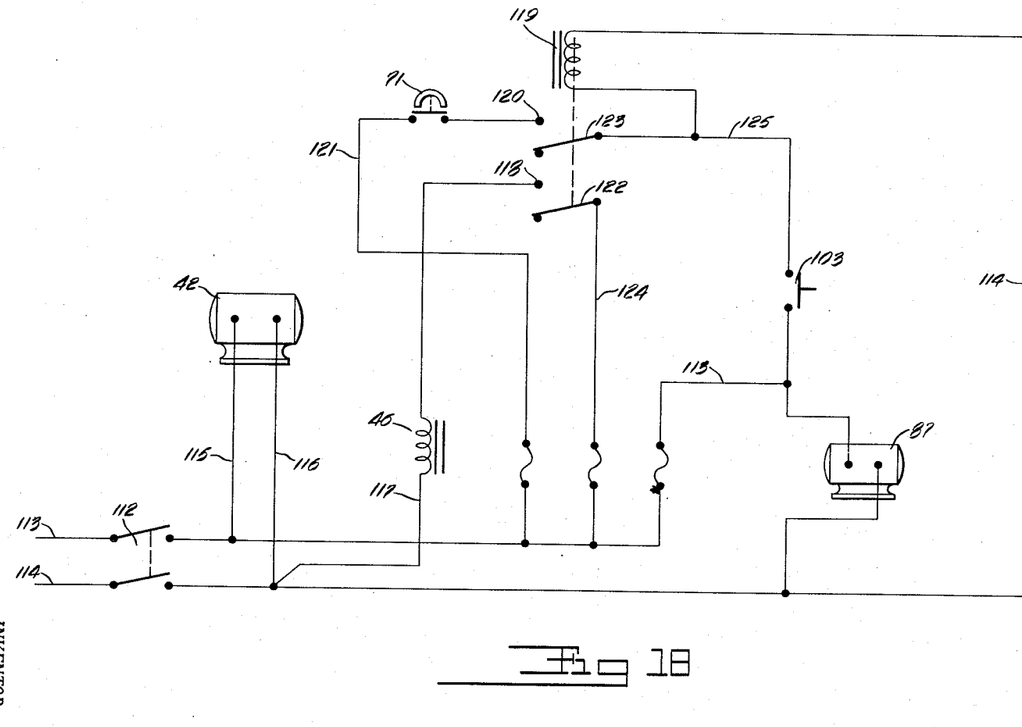
Figure 18 is a diagrammatic view showing the electric circuit of the machine.

The electric circuit for the scale is illustrated diagrammatically in Figure 18. The main power lines 113 and 114 are controlled by the main switch 112. Connected to these two power lines by the respective lines 115 and 116 is the motor 42 which drives the feed conveyor 32, the motor being continuously energized. Connected to one side of the circuit, that is, to the line 114, is a line 117 in which the coil of the clutch control solenoid 46 is connected. The end of this line 117 is provided with a contact point 118 which is part of an actuating relay 119. Another fixed contact 120 of this relay 119 is connected by a line 121 to the opposite side of the circuit, that is, to the line 113. The mercury switch 71 is connected in this line 121. The relay 119 also includes the ganged movable contact arms 122 and 123. The arm 122 is connected by a line 124 to the power line 113. The other arm 123 is connected by a line 125 to the line 114. The coil of the relay 119 is connected in the line 114 which also connects to the line 125. In the line 125 the switch 103 is also connected and is normally open. Between the lines 113 and 114, the motor 87, which drives the weigh belt 52, is connected and this motor is continuously energized.

Figure 11:
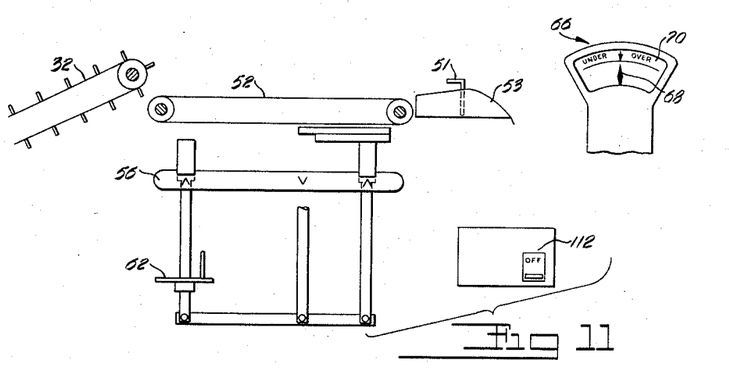
Figure 11 is a diagrammatic view showing the machine with the main control switch off so that there is no motion of the conveyors, the counterweight rack being empty and the indicator pointer at the balance mark on the indicator dial.
Figure 12:
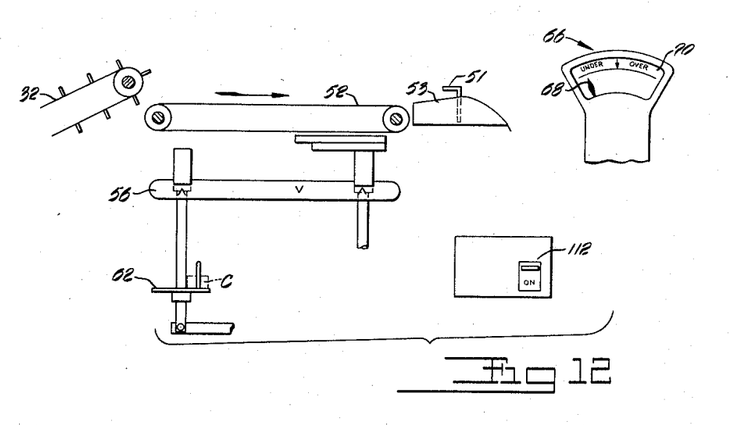
Figure 12 is a similar view but showing the machine when the main switch is on so that the weighing conveyor is driven but the feed conveyor is still stationary, a counterweight being on the rack, and the indicator pointer being in extreme underweight position relative to the dial.
Figure 13:
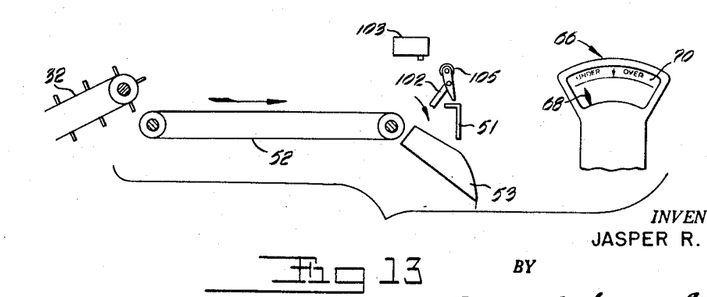
Figure 13 is a similar view but showing the discharge and scoop gate depressed to break the circuit to the control for the feed conveyor.
Figure 14:
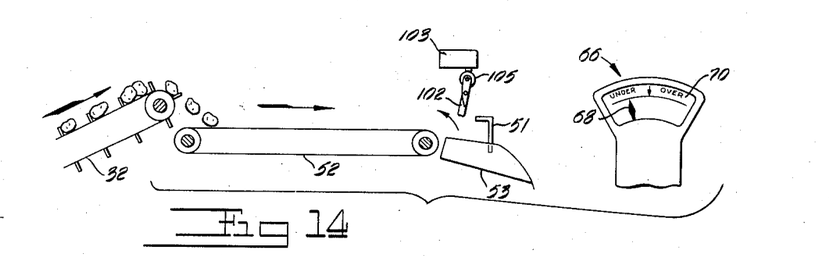
Figure 14 is a similar view but showing the scoop gate in its upper or closed position with the switch it controls actuated to complete the circuit to the feed conveyor which is moving to feed the commodity onto the weighing conveyor, the indicator pointer moving towards the balance mark on the dial in accordance with the increase in weight of material fed onto the weighing conveyor.
Figure 15:
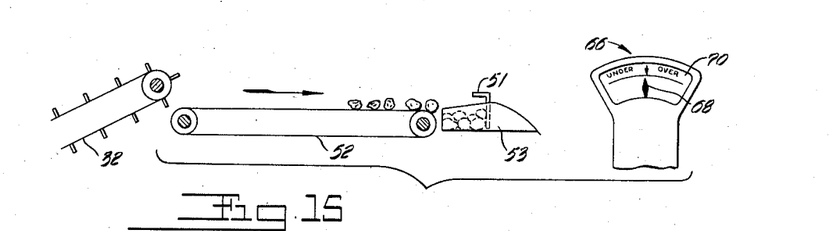
Figure 15 is a similar view but showing the indicator pointer at balance position which will operate the switch associated with the indicator to break the circuit to the feed conveyor.
Figure 16:
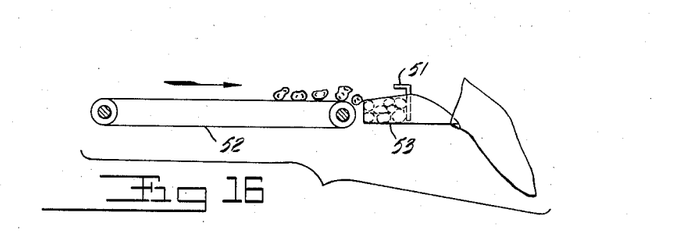
Figure 16 is a diagrammatic view showing the positioning of a bag in association with the scoop gate.
Figure 17:
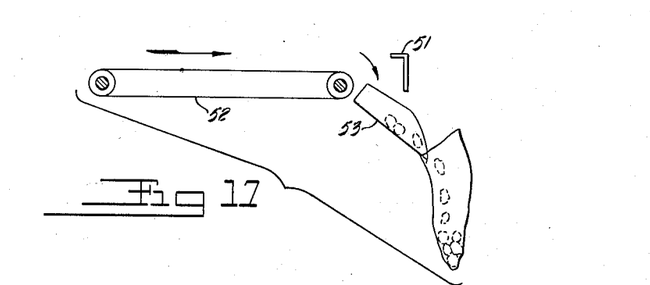
Figure 17 is a view similar to Figure 16 showing the scoop gate depressed to direct the weighed commodity charge into the bag.

The operation of the entire machine will now be described with reference to Figures 11 to 17 inclusive. The operator will stand in front of the machine adjacent the scoop gate 53. If the main switch 112 of the machine is turned off and there is no counterweight on the platform 62, as shown in Figure 11, the weighing lever 56 will be in balanced position, the indicator pointer 68 will be in exact weight position on the dial 70, the feed conveyor 32 will be stopped, the weigh belt 52 will be stopped, and the discharge scoop gate 53 will be in its upper closed position. If the operator now turns the switch 112 on and places a counterweight C on the platform 62, the machine will be in the condition illustrated in Figure 12. The counterweight will be selected to balance the charge of produce which it is desired to bag. The counterweight will cause the lever 56 to move to underweight position, moving the pointer 68 to the underweight side of the dial 70. This will close the mercury switch 71. However, this will not complete the circuit to the clutch solenoid 46 and the feed conveyor 32 will not be driven since the switch 103 will be open. The weigh belt 52 will be continuously driven and the scoop gate 53 will be in its upper closed position. To start the feeding cycle, the operator will depress the scoop as indicated in Figure 13 and then the scoop will be permitted to return to its upper position as shown in Figure 14. As the scoop comes back to its upper position the roller 105, carried by the trigger 102, engages the push button of the switch 103, closing it momentarily but moves past the button as the scoop reaches horizontal position, so that the switch 103 will again open. However, during the instant the switch 103 is closed, the circuit to the relay 119 is completed, thereby energizing the relay and causing it to complete the circuit to the coil of the solenoid 46, it being remembered that the mercury switch 71 is still closed at this time since the scale lever is still in the underweight position. Therefore, the feed conveyor 32 will be started, due to energization of the clutch solenoid 46, and will feed the produce into the weighing compartment 50 on the travelling weigh belt 52. This produce will be carried to the end of the weighing compartment onto the scoop gate 53 and, if the predetermined charge is sufficiently large, will accumulate on the belt 52, the belt merely sliding beneath the produce. Due to the fact that the scoop gate 53 forms the outer portion of the bottom of the weighing compartment 50, and is a dead surface, the produce will not pile up against the baffle 51 but will arrange itself in a shallow layer on the gate and back on the belt 52 if the charge is sufficiently large. This accumulation of produce in the weighing compartment 50 will gradually move the pointer 68 towards correct-weight position. When the pointer does reach correct-weight position, as shown in Figure 15, the mercury switch 71 will be actuated by the pointer to deenergize the coil of the clutch solenoid 46 and thereby stop the feed of the conveyor 32. At this time, the weighing compartment 50 will have a predetermined charge of produce accumulated therein. If necessary, hand trimming of the charge can be accomplished readily by removing selected articles from the weighing compartment 50 and replacing with other articles from the tray 110, or by merely removing from or adding articles to the weighing compartment. This is usually desirable due to the heterogeneous nature of produce. Also, if there are any bad articles in the produce they can be removed readily from the shallow layer in the weighing compartment. The adjustment of the switch 71 by means of the knob 73 can be used so that the feed conveyor will cut off just shortly before the correct-weight position of the indicator is reached. This may be termed "prediction" and is varied for different produce. For example, for non-uniform large articles, such as potatoes, the prediction should be comparatively great whereas for more uniform smaller articles, such as peas, the prediction can be substantially less. When the charge is correctly weighed, it is merely necessary for the operator to position a bag which has been selected from the rack 111 and has been opened, over the outer end of the scoop gate 53 and swing the scoop downwardly to direct the charge into the bag. Thus, the weighing operation is automatic but the discharge of material from the weighing compartment is controlled by the operator and this control is facilitated by the fact that the scoop gate is a dead surface rather than a moving one. The cycle can again be started merely by returning the scoop gate 53 to its upper position which will momentarily energize the microswitch 103.

It will be apparent from the above description that I have provided a weighing and bagging machine which is especially useful for weighing and bagging heterogeneous articles such as produce. With my machine I have provided for batch weighing of produce, the weighing being accomplished on a live conveyor belt in combination with a dead scoop gate. The scoop gate need not be exceptionally large and overfilling at the rear of the scoop gate or bridging while charging into the bag is prevented. The scoop gate acts as both a collecting and a direction means. With this machine it is not necessary to suspend the commodity-receiving bags and allow articles to drop substantial distances thereinto which is injurious to the scale and results in inaccuracies in the charge being weighed. However, the gate and associated parts are carried by the vertically moving weighing compartment and do not interfere with the accuracy of the weighing operation. With this machine the operator can position the bag in association with the scoop and remove it therefrom much quicker and with less trouble than if the bags were clamped in position. Furthermore, since the discharge into the bag is from a dead scoop rather than a live belt, the filling of the bags can be controlled better by the operator. The production of the machine is under the control of the operator even though the weighing is automatic. Article substitution is possible and hand trimming is permitted so that exact weight of saleable articles is produced without giving away substantial amounts of the commodity. The machine is so designed that it can be used in filling bags of various sizes without any substitution of parts or complicated adjustments. The machine is of a very rugged and fool-proof nature, is provided with a simple and highly efficient conveyor system that has a large capacity and is sufficiently strong to withstand severe shock of heavy loads and is provided with a commodity hopper, from which the feed is made, that is so designed as to prevent bridging. The machine is compact and is so arranged that the operator is comfortable in using it. Furthermore, although the machine is extremely rigid it is readily portable.

Various other advantages will be apparent.

Having thus described my invention, what I claim is:

1. A weighing machine comprising a weighing unit including a weighing compartment having a substantially horizontally disposed movable weighing conveyor and a discharge gate forming the bottom of said compartment, means for continuously driving the conveyor, a feed unit for starting and stopping the feed of material to be weighed into said compartment onto said conveyor at one end thereof, said discharge gate being mounted at the opposite discharge end of said conveyor and movably mounted for movement between normal horizontal material weighing position and material discharge position, said discharge gate having its one end pivoted and disposed at the discharge end of the conveyor and in normal weighing position being a horizontal continuation thereof but being swingable downwardly in a vertical plane relative to the conveyor into discharge position, a spring for yieldingly holding the gate in normal horizontal weighing position, a first control operated by the weighing unit and operatively connected to said feed unit to stop the feed of material by said unit only when a predetermined charge has been weighed by said weighing unit, and a second control actuated by movement of said gate into horizontal material weighing position and operatively connected to said first control to permit said first control to start the feed by said feed unit to feed a charge onto said weighing unit.

2. A weighing machine according to claim 1 in which said feed unit comprises a feed conveyor, means for driving the feed conveyor, said first and second controls controlling said driving means.

3. A weighing machine according to claim 1 in which said feed unit is electrically operated and in which said controls are switches connected in an electric circuit with said feed unit, said first control comprising an electric switch actuated by the weighing unit and said second control comprising an electric switch actuated by said discharge gate.

4. A weighing machine according to claim 3 in which said weighing unit comprises a weighing lever which carries said weighing conveyor and said discharge gate, and an indicating mechanism connected to said lever, said first control switch being actuated by said indicating mechanism.

5. A weighing machine comprising a weighing unit including a substantially horizontally disposed movable weighing conveyor upon which a charge of material to be weighed is deposited, means for continuously driving the conveyor, a feed unit for starting and stopping the feed of material to be weighed onto said conveyor at one end thereof, a discharge gate mounted at the opposite end of said conveyor and movably mounted for movement between normal horizontal material weighing position where it is a substantially horizontal continuation of the conveyor and material discharge position, a first control operated by the weighing unit and operatively connected to said feed unit to stop the feed of material by said unit only when a predetermined charge has been weighed by said weighing unit, and a second control actuated by movement of said gate into material weighing position and operatively connected to said first control to permit said first control to start the feed by said feed unit to feed a charge onto said weighing unit.

6. In a weighing machine, a weighing unit, said weighing unit comprising a surface on which the material to be weighed is supported during the weighing operation, said surface comprising a continuously moving conveyor section which has a material-supporting surface and a dead section having a material-supporting surface onto which the moving conveyor section discharges, said sections being in cooperative material-supporting relationship during the weighing operation, said dead section being movably mounted for movement between normal weighing position where it cooperates with said conveyor section in supporting said material to be weighed and a discharge position where the material received from the conveyor section is discharged.

7. The combination of claim 6 in which the weighing unit comprises a weighing compartment which has its bottom formed by said continuously moving conveyor section and said dead section, said dead section comprising a gate having one end pivoted at the discharge end of the conveyor section and being swingable between normal weighing position and discharge position, and yieldable means for holding said gate in normal weighing position.

8. The combination of claim 7 in which the gate is in the form of a scoop having a wide end pivoted at the discharge end of said conveyor section and having a converging free end for directing the discharged weighed material into a receptacle.

References Cited in the file of this patent

UNITED STATES PATENTS

| | | |
|---|---|---|
| 1,160,762 | Richardson | Nov. 16, 1915 |
| 2,102,317 | Gwinn | Dec. 14, 1937 |
| 2,127,511 | Graf | Aug. 23, 1938 |
| 2,305,484 | Merchen | Dec. 15, 1942 |
| 2,311,614 | Walter | Feb. 16, 1943 |
| 2,544,155 | Harkenrider | Mar. 6, 1951 |
| 2,605,990 | Peterson | Aug. 5, 1952 |
| 2,614,786 | Caron et al. | Oct. 21, 1952 |
| 2,732,164 | Legrow et al. | Jan. 24, 1956 |